United States Patent
Kikuchi

(10) Patent No.: US 8,254,064 B2
(45) Date of Patent: Aug. 28, 2012

(54) HEAD GIMBAL ASSEMBLY AND DISK DRIVE WITH THE SAME

(75) Inventor: Takafumi Kikuchi, Akiruno (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/153,196

(22) Filed: Jun. 3, 2011

(65) Prior Publication Data

US 2012/0002322 A1  Jan. 5, 2012

(30) Foreign Application Priority Data

Jun. 30, 2010  (JP) .................. 2010-150458

(51) Int. Cl.
*G11B 5/48* (2006.01)
(52) U.S. Cl. .................................. 360/245.9
(58) Field of Classification Search ............... 360/245.9, 360/245.7, 245.3, 245.8, 245, 245.4, 244.3, 360/234.5, 244.8, 244.1, 244
See application file for complete search history.

(56) References Cited

U.S. PATENT DOCUMENTS

| | | | | |
|---|---|---|---|---|
| 5,717,547 A | * | 2/1998 | Young | 360/246 |
| 5,737,152 A | * | 4/1998 | Balakrishnan | 360/245.9 |
| 5,995,328 A | * | 11/1999 | Balakrishnan | 360/245.9 |
| 6,038,102 A | * | 3/2000 | Balakrishnan et al. | 360/264.2 |
| 6,275,358 B1 | * | 8/2001 | Balakrishnan et al. | 360/264.2 |

FOREIGN PATENT DOCUMENTS

| | | |
|---|---|---|
| JP | 08-242045 A2 | 9/1996 |
| JP | 2004-128212 A2 | 4/2004 |
| JP | 2005-268649 A2 | 9/2005 |

* cited by examiner

*Primary Examiner* — Allen Cao

(74) *Attorney, Agent, or Firm* — Knobbe, Martens, Olson & Bear LLP

(57) ABSTRACT

According to one embodiment, a head gimbal assembly includes a load beam, a metal plate mounted on the load beam and constituting a gimbal includes a limiter portion, a flexure includes a plurality of conductors formed over the metal plate with an insulating layer therebetween, a slider includes a head and mounted on the gimbal, and a positioning reference mark formed on the limiter portion by parts of the conductors and configured to position the slider. The plurality of conductors includes conductors which conduct to the positioning reference mark through the metal plate and constitute an interleaved structure.

10 Claims, 8 Drawing Sheets

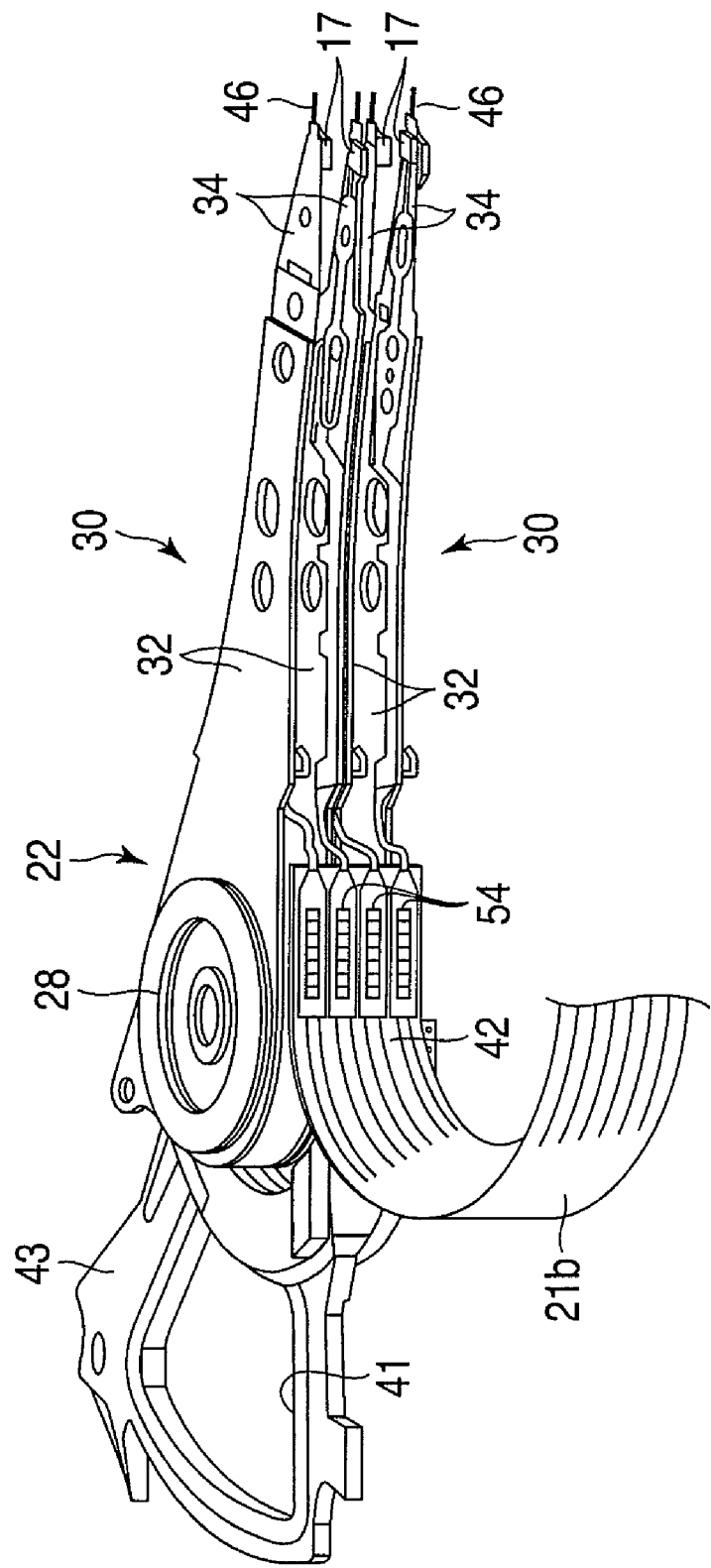
F I G. 2

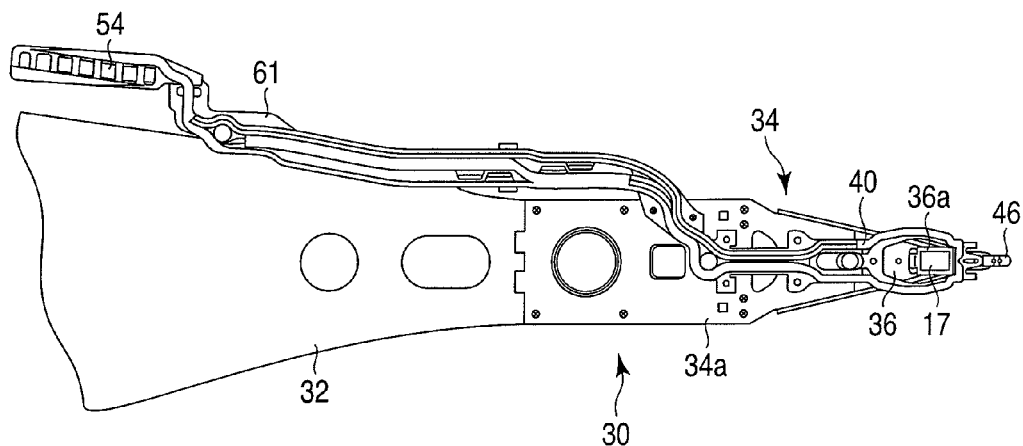
F I G. 3
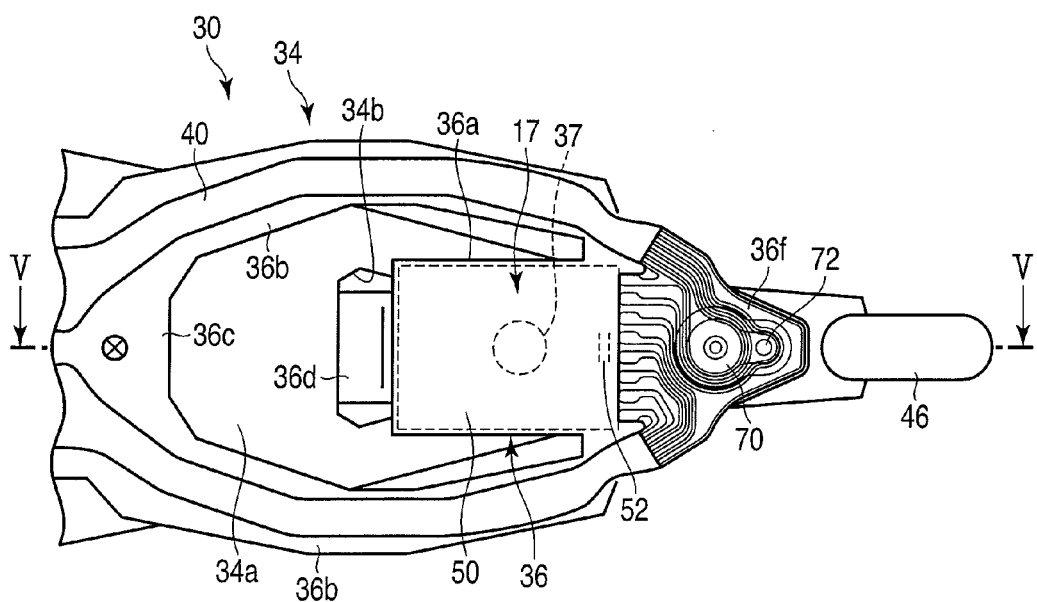
F I G. 4

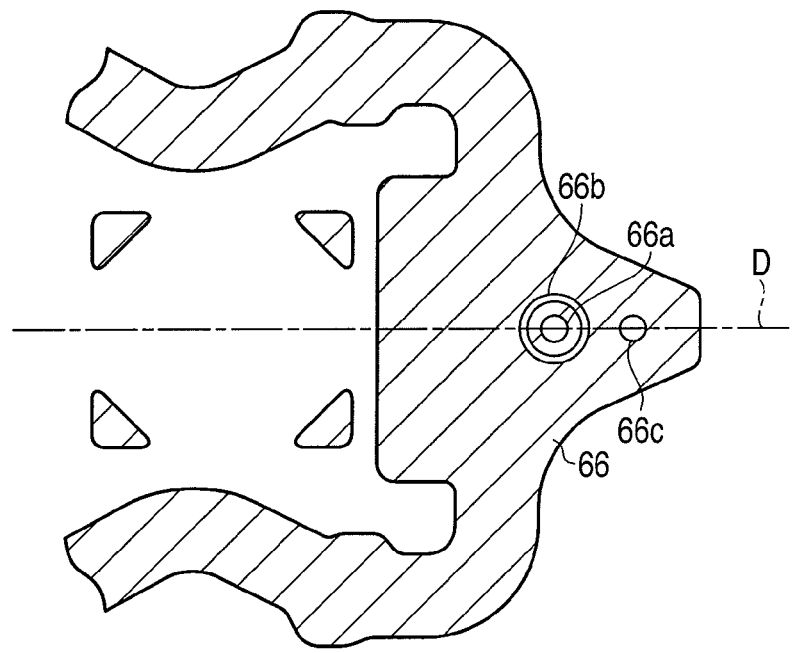
F I G. 11
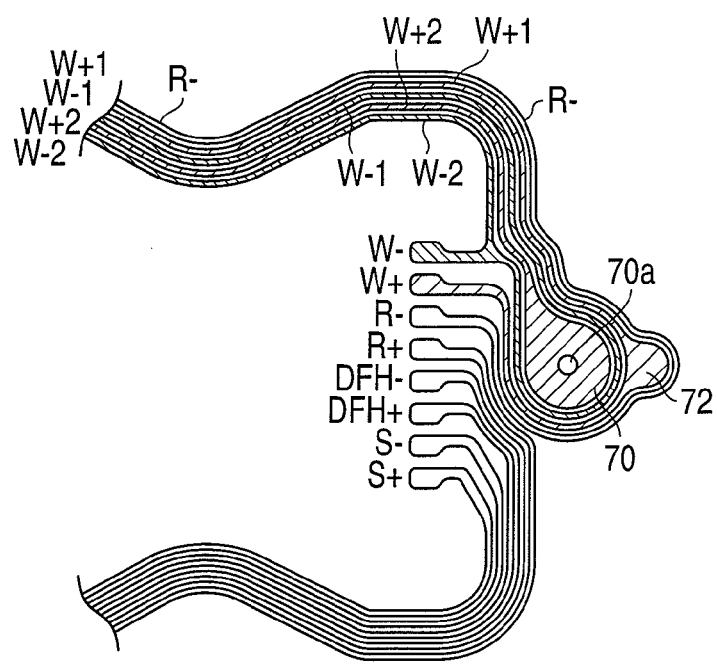
F I G. 12

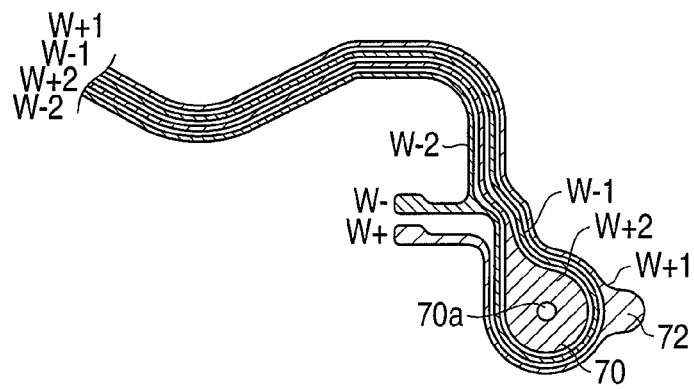
F I G. 13
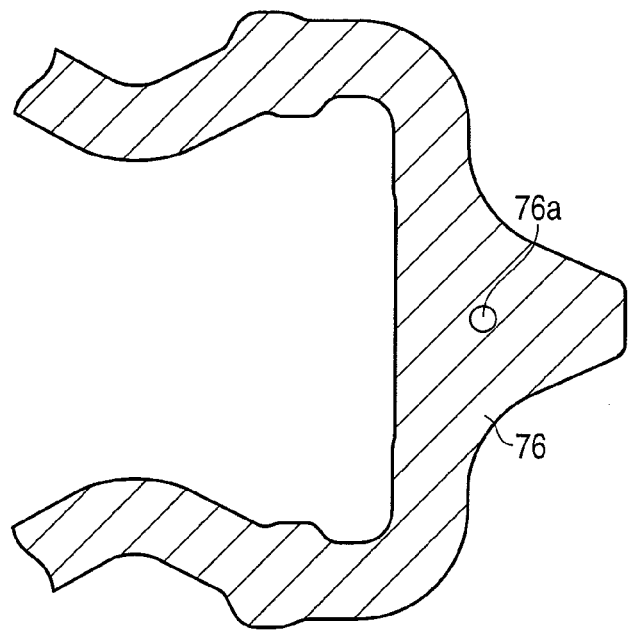
F I G. 14
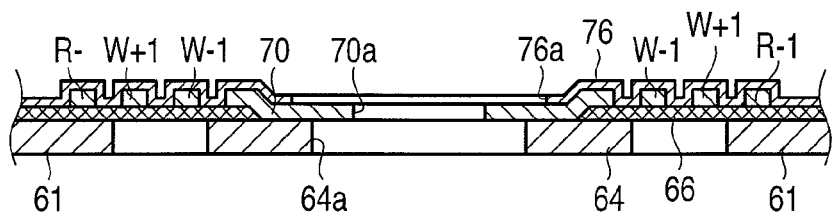
F I G. 15

US 8,254,064 B2

HEAD GIMBAL ASSEMBLY AND DISK DRIVE WITH THE SAME

CROSS-REFERENCE TO RELATED APPLICATIONS

This application is based upon and claims the benefit of priority from Japanese Patent Application No. 2010-150458, filed Jun. 30, 2010; the entire contents of which are incorporated herein by reference.

FIELD

Embodiments described herein relate generally to a head gimbal assembly used in a disk drive and the disk drive provided with the same.

BACKGROUND

In recent years, disk drives, such as magnetic disk drives, optical disc drives, etc., have become widely used as external recording devices of computers and image recording devices.

In general, a disk drive, e.g., a magnetic disk drive, comprises a magnetic disk in a case, spindle motor configured to support and rotate the disk, head actuator that supports magnetic heads, circuit board unit, etc. The head actuator comprises a head gimbal assembly, which comprises a suspension supporting the magnetic heads and a conductor trace that electrically connects the heads to the circuit board unit.

In modern disk drives, such as optical disc drives, an interleaved structure that enables low-impedance signal transfer is introduced into a conductor trace to cope with a high transfer rate. The conductor impedance can be reduced by using the interleaved structure and alternately parallelly arranging conductors through which currents flow in opposite directions.

In the case where the above-described interleaved structure is applied to a magnetic disk drive, it is believed that the highest impedance lowering effect can be obtained by installing the interleaved structure at a limiter portion of the conductor trace near a slider so that all channels on the suspension are interleaved. However, the interleaved structure requires use of a metal plate that relays signal lines. If the interleaved structure is installed, therefore, the limiter portion of the conductor trace is inevitably enlarged. Consequently, the amplitude of vibration of the limiter portion increases while a magnetic head is being unloaded or if it is jolted when not in operation, and components interfere with one another during assembly. Thus, a ramp cannot be miniaturized.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary perspective view showing a head stack assembly of the HDD;

FIG. 3 is an exemplary plan view showing a head gimbal assembly of the head stack assembly;

FIG. 4 is an exemplary enlarged plan view showing the distal end portion of the head gimbal assembly;

FIG. 11 is an exemplary plan view showing an insulating layer constituting the conductor trace;

FIG. 12 is an exemplary plan view showing conductors (copper layers) constituting the conductor trace;

FIG. 13 is an exemplary plan view extractively showing only write signal lines (writer conductors) out of the conductors (copper layers) constituting the conductor trace;

FIG. 14 is an exemplary plan view showing a cover layer constituting the conductor trace; and FIG. 15 is an exemplary sectional view of a limiter portion of a head gimbal assembly of an HDD according to a second embodiment.

DETAILED DESCRIPTION

Various embodiments will be described hereinafter with reference to the accompanying drawings.

In general, according to an embodiment, a head gimbal assembly comprises a load beam; a metal plate mounted on the load beam and constituting a gimbal comprising a limiter portion; a flexure comprising a plurality of conductors formed over the metal plate with an insulating layer therebetween; a slider comprising a head and mounted on the gimbal; and a positioning reference mark formed on the limiter portion by parts of the conductors and configured to position the slider. The plurality of conductors includes conductors which conduct to the positioning reference mark through the metal plate and constitute an interleaved structure.

Figure 1:
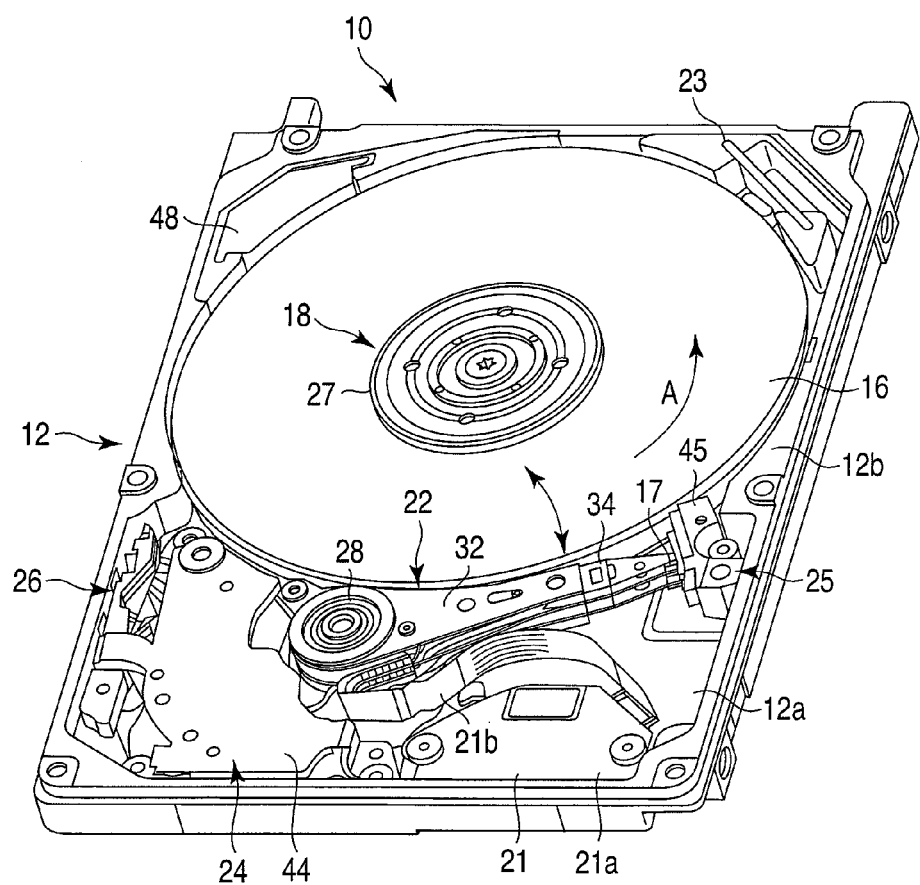
FIG. 1 is an exemplary perspective view showing a hard disk drive (HDD) according to a first embodiment with its top cover removed.

A magnetic disk drive (HDD) according to a first embodiment will now be described in detail. FIG. 1 shows the internal structure of the HDD with its top cover removed. As shown in FIG. 1, the HDD comprises a housing 10. The housing 10 comprises a base 12 in the form of an open-topped rectangular box and a top cover (not shown), which is attached to the base by screws so as to close the top opening of the base. The base 12 comprises a rectangular bottom wall 12a and sidewall 12b set up along the peripheral edge of bottom wall.

The housing 10 contains two magnetic disks 16 for use as recording media and a spindle motor 18 for use as a drive section that supports and rotates the magnetic disks 16. The spindle motor 18 is disposed on the bottom wall 12a. Each magnetic disk 16 has a diameter of, for example, 65 mm (2.5 inches) and comprises magnetic recording layers on its upper and lower surfaces, individually. The magnetic disks 16 are coaxially fitted on a hub (not shown) of the spindle motor 18 and clamped and secured to the hub by a clamp spring 27. Thus, the magnetic disks 16 are supported parallel to the bottom wall 12a of the base 12. The disks 16 are rotated at a predetermined speed, e.g., 5,400 or 7,200 rpm, by the spindle motor 18.

The housing 10 contains a plurality of magnetic heads 17, head stack assembly (HSA) 22, and voice coil motor (VCM) 24. The magnetic heads record and reproduce data on and from the magnetic disks 16. The HSA 22 supports the heads 17 for movement relative to the disks 16. The VCM 24 pivots and positions the HSA. The housing 10 further contains a ramp loading mechanism 25, latch mechanism 26, and board unit 21. The ramp loading mechanism 25 holds the magnetic heads 17 in a retracted position off the magnetic disks 16 when the heads are moved to the outermost peripheries of the disks. The latch mechanism 26 holds the HSA in its retracted position if the HDD is jolted. The board unit 21 comprises a preamplifier and the like.

A printed circuit board (not shown) is attached to the outer surface of the bottom wall 12a of the base 12 by screws. This circuit board controls the operations of the spindle motor 18, VCM 24, and magnetic heads 17 through the board unit 21. A circulatory filter 23 that traps dust produced in the housing 10 as a movable part or parts are operated is disposed on the sidewall of the base 12. The filter 23 is located outside the magnetic disks 16. Likewise, a breather filter 48 that traps dust in the external air introduced into the housing 10 is disposed on the sidewall of the base 12.

FIG. 2 is an exemplary perspective view of the HSA 22. As shown in FIGS. 1 and 2, the HSA 22 comprises a rotatable bearing unit 28 and a plurality of stack members mounted in layers on the bearing unit 28. The stack members include four head gimbal assemblies (HGAs) 30 and two spacer rings sandwiched between the HGAs.

The bearing unit 28 is located at a distance from the center of rotation of the magnetic disks 16 longitudinally relative to the base 12 and near the outer peripheral edges of the disks 16. The bearing unit 28 comprises a pivot set up on the bottom wall 12a of the base 12 and a cylindrical sleeve rotatably supported on the pivot by bearings.

As shown in FIGS. 1 to 3, each HGA 30 comprises an arm 32 extending from the bearing unit 28, a suspension 34 extending from the arm, and one of the magnetic heads 17 supported on the extended end of the suspension by a gimbal.

The arm 32 is a thin flat plate formed by laminating, for example, stainless-steel, aluminum, and stainless-steel sheets. A circular through-hole is formed in one end or proximal end of the arm 32. The suspension 34 comprises a load beam 34a in the form of an elongated plate spring and a gimbal 36 (described later) mounted on the load beam. The suspension 34 has its proximal end secured to the distal end of the arm 32 by spot welding or adhesive bonding and extends from the arm. The suspension 34 and arm 32 may be integrally formed of the same material. The HGA 30 may be a concept that does not include an arm.

A flexure 40 for use as a conductor trace is mounted on the arm 32 and load beam 34a. The magnetic head 17 is electrically connected to a main FPC 21b (described later) through the flexure 40.

As shown in FIGS. 1 and 2, the four HGAs 30 and spacer rings are fitted on the sleeve of the bearing unit 28 that is passed through the respective through-holes of the arms 32 and spacer rings, and are laminated along the axis of the sleeve. The four arms 32 are located parallel to one another with predetermined spaces therebetween and extend in the same direction from the bearing unit 28. The two upper arms 32 are located parallel to each other with a predetermined space therebetween, and the suspensions 34 and magnetic heads 17 on these arms face one another. Likewise, the two lower arms 32 are located parallel to each other with a predetermined space therebetween, and the suspensions 34 and magnetic heads 17 on these arms face one another.

A support frame 43 of a synthetic resin is integrally molded on one of the spacer rings. The support frame 43 extends from the bearing unit 28 on the opposite side to the arms 32. A voice coil 41 that constitutes a part of the VCM 24 is embedded in the support frame 43.

As seen from FIG. 1, the lower end portion of the pivot of the bearing unit 28 is secured to the base 12 with the HSA 22 constructed in the above-described manner incorporated on the base 12. The bearing unit 28 stands substantially parallel to the spindle of the spindle motor 18. Each magnetic disk 16 is located between its corresponding two of the HGAs 30. When the HDD is active, the magnetic heads 17 on the arms 32 face the upper and lower surfaces, individually, of the magnetic disk 16 and hold the disk from both sides. The voice coil 41 secured to the support frame 43 is located between a pair of yokes secured to the base 12. Thus, the voice coil, along with the yokes and a magnet (not shown) secured to one of the yokes, constitutes the VCM 24.

As shown in FIG. 1, the board unit 21 comprises a main body 21a formed of a flexible printed circuit board, which is secured to the bottom wall 12a of the base 12. Electronic components (not shown), including a head amplifier, are mounted on the main body 21a. A connector (not shown) for connection with the printed circuit board is mounted on the bottom surface of the main body 21a.

The board unit 21 comprises the main flexible printed circuit board (main FPC) 21b extending from the main body 21a. An extended end of the main FPC 21b constitutes a connecting end portion 42. As described later, the connecting end portion 42 comprises a plurality of connecting pads and is secured to the vicinity of the bearing unit 28 of the HSA 22. The flexure 40 of each HGA 30 is mechanically and electrically connected to the connecting end portion 42. Thus, the board unit 21 is electrically connected to each magnetic head 17 through the main FPC 21b and flexure 40.

The ramp loading mechanism 25 comprises a ramp 45 (FIG. 1) and tabs 46 (FIGS. 2 and 3). The ramp 45 is disposed on the bottom wall 12a of the base 12 and located outside the magnetic disks 16. The tabs 46 extend individually from the respective distal ends of the suspensions 34. When the HSA 22 pivots around the bearing unit 28 so that the magnetic heads 17 move to the retracted position outside the disks 16, each of the tabs 46 engages with a ramp surface 45a (FIG. 6) formed on the ramp 45 and is then pushed up the ramp surface. Thereupon, the heads 17 are unloaded and held in the retracted position. The ramp 45 comprises a stepped gimbal retainer 45b (FIG. 6), which faces a limiter portion of the gimbal and prevents excessive displacement of the gimbal.

The HGA 30 will now be described in detail. FIG. 4 is an enlarged view of the distal end portion of the suspension 34 and the magnetic head, and FIG. 5 is a sectional view of the distal end portion of the suspension.

Figure 5:
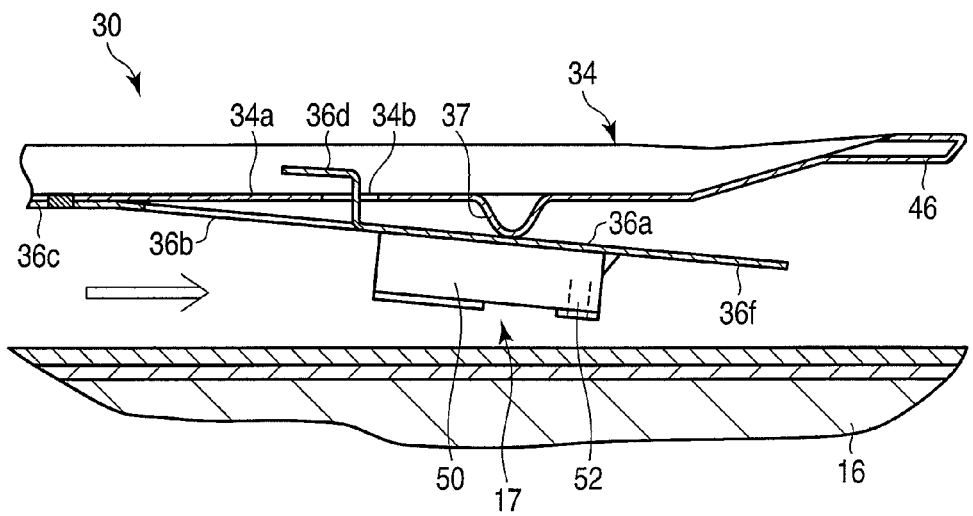
FIG. 5 is an exemplary sectional view of the distal end portion of the head gimbal assembly taken along line V-V of FIG. 4.

As shown in FIGS. 3 to 5, the gimbal 36 is mounted on the disk-facing side of the load beam 34a. The gimbal 36 is, for example, an elongated thin band of stainless steel. The gimbal 36 comprises a flat, rectangular head mounting portion 36a, elastic portions 36b, and band-like fixed portion 36c. The elastic portions 36b bifurcate from the head mounting portion toward the proximal end of the arm 32. The fixed portion 36c extends from the elastic portions toward the proximal end of the arm. The mounting portion 36a faces the distal end portion of the load beam 34a with a gap therebetween and is located so that its central axis is substantially aligned with that of the load beam 34a. The elastic portions 36b extend spaced apart from each other on the opposite sides of the mounting portion 36a. The fixed portion 36c is secured to the load beam 34a by, for example, spot welding.

Figure 6:
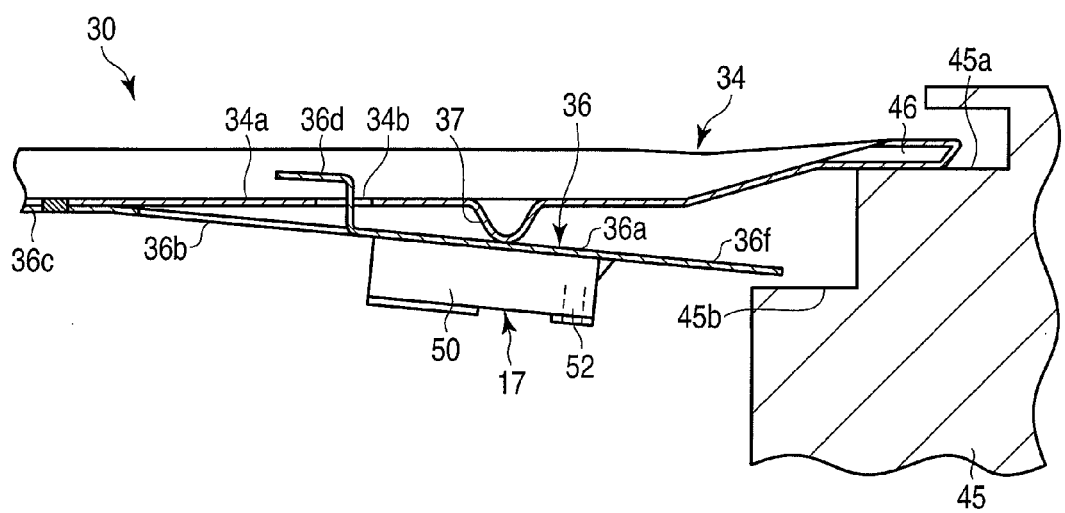
FIG. 6 is an exemplary sectional view of the head gimbal assembly and a ramp, showing how the distal end portion of the gimbal assembly engages with the ramp after a magnetic head is unloaded.

The gimbal 36 integrally comprises a trailing-side limiter portion 36f extending from the head mounting portion 36a toward the distal end. If the magnetic heads 17 are unloaded so that the tabs 46 of the HGA 30 are supported on the ramp surface 45a of the ramp 45, as shown in FIG. 6, the limiter portion 36f faces or abuts the gimbal retainer 45b of the ramp 45, thereby preventing excessive displacement of the gimbal 36 and heads 17.

As shown in FIGS. 4 and 5, the gimbal 36 comprises a leading-side limiter 36d extending from the head mounting portion 36a toward the proximal end. This limiter 36d extends to above the load beam 34a through a through-hole 34b therein, and its extended end portion faces the upper surface of the load beam with a gap therebetween. If the mounting portion 36a moves a long distance toward the magnetic disks 16, the limiter 36d abuts the load beam 34a, thereby preventing excessive movement of the mounting portion 36a.

As shown in FIGS. 3 to 5, the magnetic head 17 is mounted on the head mounting portion 36a of the gimbal 36. Each magnetic head 17 comprises a substantially rectangular slider 50 and head section 52 formed on the slider. The head section 52 comprises, for example, a recording element and magnetoresistive (MR) element for reproduction. The slider 50 has a size corresponding to the mounting portion 36a and its backside is secured to the mounting portion 36a by, for example, adhesive bonding.

A dimple or substantially hemispheric protrusion 37, projecting on the magnetic disk side in this case, is formed at that position on the load beam 34a which faces the head mounting portion 36a of the gimbal 36, that is, the central portion of the magnetic head 17. The protrusion 37 abuts the mounting portion 36a from behind the head 17. The mounting portion 36a is elastically pressed against the protrusion 37 by the elasticity of the elastic portions 36b. The magnetic head 17 and the mounting portion 36a of the gimbal 36 can be displaced in the pitch and roll directions or vertically around the protrusion 37 by elastic deformation of the elastic portions 36b. Further, the magnetic head 17 is subjected to a predetermined head load produced by the spring force of the suspension 34 and directed to the surface of the magnetic disk 16.

As shown in FIGS. 3 and 4, the flexure 40 is mounted on the inner surface of the suspension 34 and extends from the distal end of the suspension to the proximal end portion of the arm 32. The flexure 40 comprises a thin metal plate 61 of stainless steel or the like, insulating layer formed on the metal plate, trace pattern (including a plurality of conductors) of copper foil, and cover that covers the trace pattern. The flexure 40 is in the form of an elongated band as a whole, whose distal end is electrically connected to an electrode (not shown) of the magnetic head 17. The other end portion of the flexure 40 extends outward from the arm 32 and constitutes a terminal area 54. Each terminal area 54 is electrically and mechanically connected to the connecting end portion 42 of the main FPC 21b.

On the side of the metal plate 61, the flexure 40 is affixed or pivotally welded to the arm 32 and suspension 34. The suspension-side end portion of the metal plate 61 is formed integrally with the gimbal 36.

Figure 7:
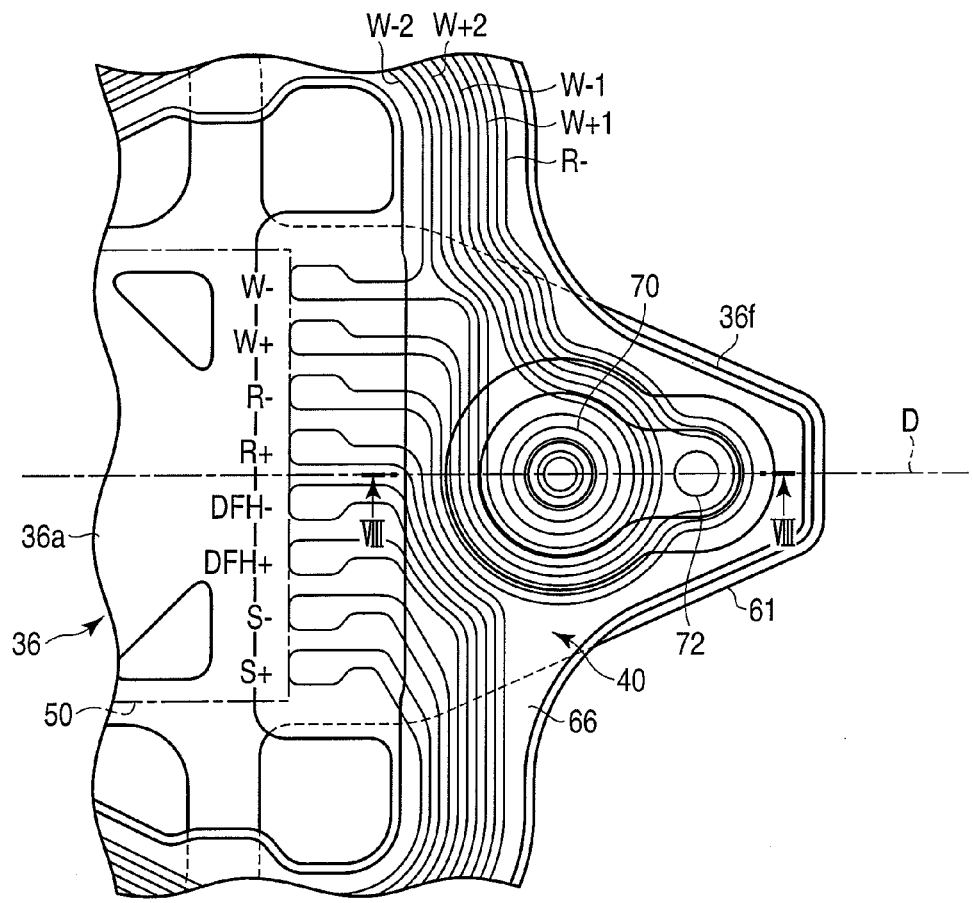
FIG. 7 is an exemplary enlarged plan view showing a limiter portion of a conductor trace of the head gimbal assembly.
Figure 8:
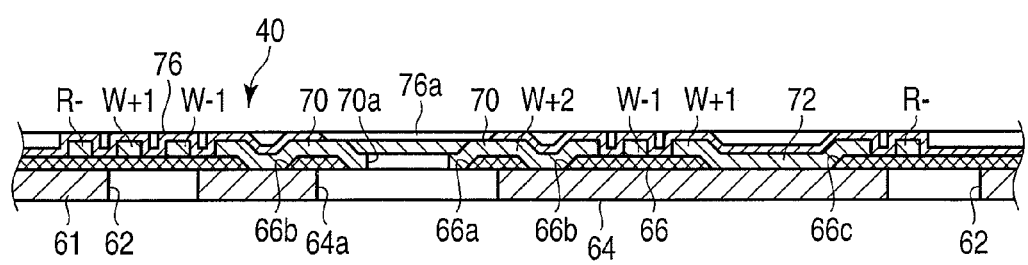
FIG. 8 is an exemplary sectional view of the limiter portion taken along line VIII-VIII of FIG. 7.
Figure 9:
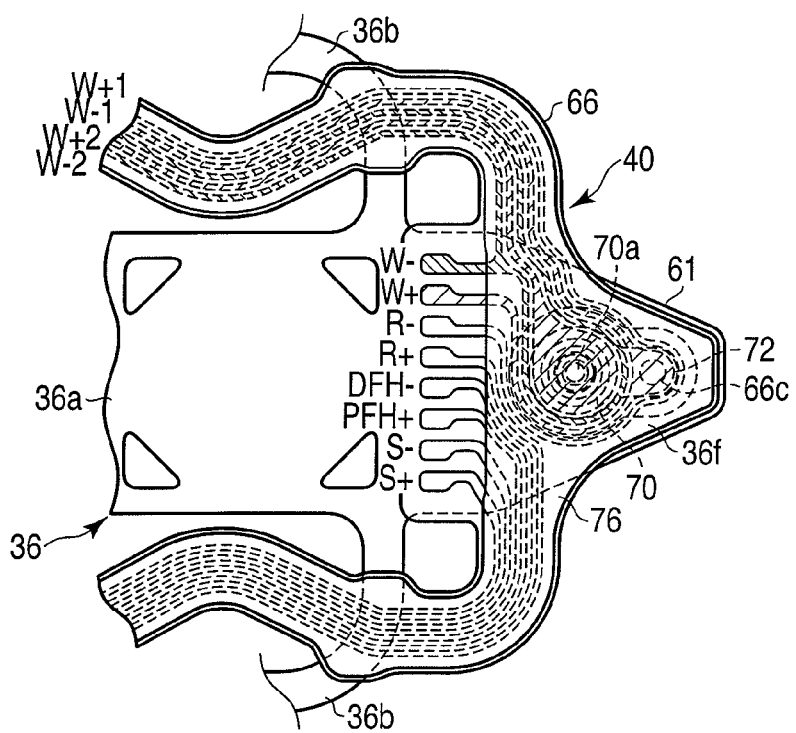
FIG. 9 is an exemplary enlarged plan view schematically showing a gimbal and the conductor trace including the limiter portion.
Figure 10:
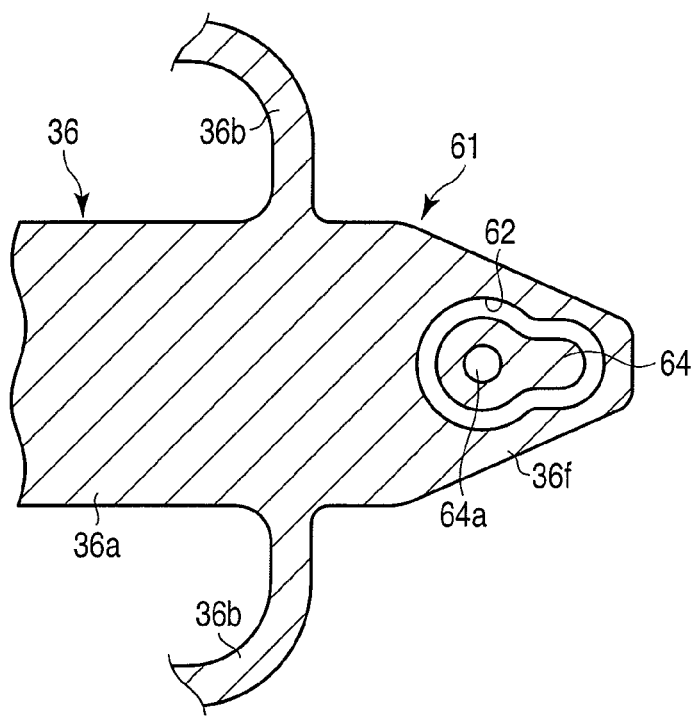
FIG. 10 is an exemplary plan view showing a metal plate portion constituting the conductor trace.

FIG. 7 is an enlarged view schematically showing that part of the flexure 40 which is located on the distal-end side of the suspension, and FIG. 8 is a sectional view showing an interleaved structure portion of the flexure and a positioning reference mark. Further, FIG. 9 shows a general configuration of the part of the flexure 40 on the distal-end side of the suspension, and FIGS. 10 to 14 show the constituent elements of the flexure, that is, the thin metal plate, insulating layer, trace pattern, write signal line pattern, and cover, respectively.

As shown in FIGS. 7 to 10, the metal plate 61 of the flexure 40 that doubles as the gimbal 36 comprises an opening 62 in a central portion of the limiter portion 36f and a floating island portion 64 located in the opening with a gap therearound. A circular through-hole 64a is formed in the floating island portion 64.

As shown in FIGS. 7 to 9 and 11, an insulating layer 66 is disposed overlapping the greater part of the thin metal plate 61, that is, partially overlapping at least the limiter portion 36f and mounting portion 36a. The insulating layer 66 is formed with a through-hole 66a, annular opening 66b, and through-hole 66c. The through-hole 66a is concentric with the through-hole 64a of the of the floating island portion 64. The opening 66b is also concentric with the through-hole 64a and larger in diameter than the through-hole 64a. The through-hole 66c is located side by side with the through-hole 66a on the central axis D of the gimbal 36.

As shown in FIGS. 7 to 9 and 12, a trace pattern formed of a copper layer comprises a plurality of conductors overlapping the insulating layer 66. These conductors include, for example, eight types, positive and negative write signal lines W+ and W−, positive and negative read signal lines R+ and R−, positive and negative signal lines DFH+ and DFH− for heater control, and positive and negative signal lines S+ and S− for sensor control. Eight electrodes connected to these conductors are arranged along an end edge of the mounting portion 36a. A plurality of electrodes (not shown) on the slider 50 that is mounted on the mounting portion 36a of the gimbal 36 are soldered and electrically connected to the electrodes of the conductors, individually.

Of the plurality of conductors, the positive read signal line R+, positive and negative signal lines DFH+ and DFH− for heater control, and positive and negative signal lines S+ and S− for sensor control, for example, are drawn out of the electrodes to one side and extend toward the proximal end of the suspension 34 through one side portion of the slider 50. The negative read signal line R− is drawn out toward the limiter portion 36f, passes around the positioning reference mark (described later), and then extends toward the proximal end of the suspension 34 through the opposite side portion of the slider 50.

Of the plurality of conductors, the positive and negative write signal lines W+ and W−, for example, bifurcate individually from the electrodes and form two positive branch signal lines W+1 and W+2 and two negative branch signal lines W−1 and W−2, respectively.

An end portion of the positive branch signal line W+2 is kept apart from the electrode and is circularly formed to constitute a positioning reference mark 70. The reference mark 70 is formed overlapping the floating island portion 64 and concentrically with the respective through-holes 64a and 66a of the floating island portion 64 and insulating layer 66. Further, the reference mark 70 electrically conducts to the floating island portion 64 through the opening 66b of the insulating layer 66. A through-hole 70a is formed in the center of the reference mark 70. The positive branch signal line W+2 extends from the reference mark 70 toward the proximal end of the suspension 34 through the opposite side portion of the slider 50.

In mounting the slider 50 on the mounting portion 36a of the gimbal 36, an image of the positioning reference mark 70 is captured by means of an image identifier or the like so that it can be used as positioning reference for the slider and as a reference for the size measurement of the flexure 40 itself.

The positive branch signal line W+1 is drawn out of the electrode toward the limiter portion 36f, passes around the positioning reference mark 70, and then extends toward the proximal end of the suspension 34 through the opposite side portion of the slider 50. A part of the negative branch signal line W−1 defines a terminal area 72, which electrically conducts to the floating island portion 64 of the metal plate 61 through the through-hole 66c of the insulating layer 66. The terminal area 72 is located side by side with the reference mark 70 on the central axis D of the gimbal 36. Thus, the negative branch signal line W−1 electrically conducts to that part of the positive branch signal line W+1 which corresponds to the reference mark 70 through the floating island portion 64. Since the floating island portion 64 is electrically isolated from the other part of the metal plate 61, the positive branch signal lines W+1 and W+2 never conduct to the other signal lines.

The negative branch signal line W−1 is drawn out of the electrode toward the limiter portion 36f, passes between the positive branch signal lines W+1 and W+2 and around the positioning reference mark 70, and then extends toward the proximal end of the suspension 34 through the opposite side portion of the slider 50 and between the signal lines W+1 and W+2. The negative branch signal line W−2 diverges from the electrode and then extends side by side with the positive branch signal line W+2 and toward the proximal end of the suspension 34 through the opposite side portion of the slider 50. In this way, the four branch signal lines W+1, W+2, W−1 and W−2 extend side by side so that the positive and negative ones are alternately arranged, thus constituting an interleaved structure.

As shown in FIGS. 7 to 9 and 14, a cover 76 formed of, for example, a transparent insulating material is laid on the entire trace pattern except the electrode portions of the conductors. The cover 76 is formed with a circular through-hole 76a, which is located overlapping the central portion of the positioning reference mark 70.

According to the HDD and HGA 30 constructed in this manner, the signal lines double as the interleaved signal line structure and the conductors of the flexure, that is, the positioning reference mark 70 at the limiter portion 36f. Therefore, the interleaved structure and reference mark do not need to be independently provided at the limiter portion 36f, so that the limiter portion can be made compact. Thus, the amplitude of vibration of the limiter portion can be prevented from increasing while the magnetic head is being unloaded or if it is jolted when not in operation, so that the ramp can be miniaturized. Consequently, the HDD can be miniaturized as a whole. At the same time, there may be provided a head gimbal assembly and magnetic disk drive with high performance and reliability to cope with a high transfer rate, in which flexure conductors are interleaved.

The positioning reference mark 70 is not limited to the circular shape, and may alternatively be formed to have a polygonal, elliptical, or any other suitable shape. As in a second embodiment shown in FIG. 15, moreover, a positioning reference mark 70 may be formed to have such a substantially annular shape that its central portion conducts to a floating island portion 64 of a metal plate 61. Like reference numbers are used to designate like parts in the first and second embodiments, and a detailed description of those parts is omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the interleaved signal lines are not limited to the positive and negative write signal lines and may also be applied to other signal lines. Further, the terminal area for the signal lines may be located off the central axis of the gimbal. Although the signal lines of the flexure are assumed to include eight types herein, they may be increased or decreased if necessary.

The respective arms of the HGAs used in each of the embodiments described herein are independent plate-like arms. However, these arms may be replaced with a so-called E-block structure comprising a plurality of arms and a bearing sleeve that are formed integrally with one another. The magnetic disks are not limited to 2.5-inch disks and may be of other sizes. Further, the disks used are not limited to two in number and may be one or three or more. The number of HGAs may also be varied according to the number of installed disks.

What is claimed is:

1. A head gimbal assembly comprising:
a load beam;
a metal plate on the load beam, the metal plate forming a gimbal comprising a limiter portion;
a flexure comprising a plurality of conductors over the metal plate;
an insulating layer between the plurality of conductors and the metal plate;
a slider on the gimbal, the slider comprising a head; and
a positioning reference mark on the limiter portion, the positioning reference mark comprising one or more parts of the conductors and configured to position the slider,
wherein the plurality of conductors are configured to conduct electricity to the positioning reference mark through the metal plate, and
wherein the plurality of conductors form an interleaved structure.

2. The head gimbal assembly of claim 1, wherein:
the metal plate comprises an opening and a floating island portion located in the opening with a gap therearound, and
the positioning reference mark and the conductors are configured to conduct electricity to one another via the floating island portion.

3. The head gimbal assembly of claim 2, wherein:
the conductors comprise a positive write signal line and a negative write signal line, each individually connected to the head,
the positive signal line comprises two positive branch signal lines bifurcating from the head,
the negative signal line comprises two negative branch signal lines bifurcating from the head,
the two positive branch signal lines and the two negative branch signal lines are arranged in parallel with one another,
one of the positive and negative branch signal lines forms the positioning reference mark at an end portion on the side of the head, and
the other of the positive and negative branch signal lines comprises a terminal area configured to conduct electricity to the positioning reference mark through the metal plate.

4. The head gimbal assembly of claim 3, wherein the positioning reference mark and the terminal areas of the branch signal lines are located side by side along a central axis of the gimbal.

5. The head gimbal assembly of claim 1, wherein the positioning reference mark is circular and comprises a through-hole in a central portion thereof.

6. A disk drive comprising:
a disk recording medium;
a drive motor configured to support and rotate the recording medium; and
a head stack assembly supporting a head, and configured to move the head relative to the recording medium,
wherein the head stack assembly comprises a bearing and a plurality of head gimbal assemblies supported on the bearing, and
wherein each of the head gimbal assemblies comprises:
a load beam;
a metal plate on the load beam, the metal plate forming a gimbal comprising a limiter portion;
a flexure comprising a plurality of conductors over the metal plate;
an insulating layer between the plurality of conductors and the metal plate;
a slider on the gimbal, the slider comprising a head; and
a positioning reference mark on the limiter portion, the positioning reference mark comprising one or more parts of the conductors and configured to position the slider, the plurality of conductors comprising conductors configured to conduct electricity to the positioning reference mark through the metal plate, the plurality of conductors forming an interleaved structure.

7. The disk drive of claim 6, wherein:
the metal plate comprises an opening and a floating island portion located in the opening with a gap therearound, and
the positioning reference mark and the conductors are configured to conduct electricity to one another via the floating island portion.

8. The disk drive of claim 7, wherein:
the conductors comprise a positive write signal line and a negative write signal line, each individually connected to the head,
the positive signal line comprises two positive branch signal lines bifurcating from the head,
the negative signal line comprises two negative branch signal lines bifurcating from the head,
the two positive branch signal lines and the two negative branch signal lines are arranged in parallel with one another,
one of the positive and negative branch signal lines forms the positioning reference mark at an end portion on the side of the head, and
the other of the positive and negative branch signal lines comprises a terminal area configured to conduct electricity to the positioning reference mark through the metal plate.

9. The disk drive of claim 8, wherein the positioning reference mark and the terminal areas of the branch signal lines are located side by side along a central axis of the gimbal.

10. The disk drive of claim 6, wherein the positioning reference mark is circular and comprises a through-hole in a central portion thereof.

* * * * *